(12) United States Patent
Kuwahara et al.

(10) Patent No.: US 7,091,293 B2
(45) Date of Patent: Aug. 15, 2006

(54) STEREOREGULAR POLAR VINYL POLYMERS AND METHODS OF MAKING THE SAME

(75) Inventors: Hiroaki Kuwahara, Yamaguchi (JP); Bruce Novak, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 10/512,448

(22) PCT Filed: May 9, 2003

(86) PCT No.: PCT/US03/14585

§ 371 (c)(1),
(2), (4) Date: Apr. 11, 2005

(87) PCT Pub. No.: WO03/099878

PCT Pub. Date: Dec. 4, 2003

(65) Prior Publication Data

US 2005/0176904 A1 Aug. 11, 2005

Related U.S. Application Data

(60) Provisional application No. 60/379,470, filed on May 10, 2002.

(51) Int. Cl.
*C08F 20/00* (2006.01)
*C08F 4/14* (2006.01)

(52) U.S. Cl. ............ 526/238; 526/171; 526/209; 526/210; 526/217; 526/219; 526/219.2; 526/237; 522/184; 252/182.14; 252/182.33; 252/182.35

(58) Field of Classification Search .......... 526/237, 526/240, 241, 171, 209, 210, 217, 219, 219.2, 526/238; 522/184; 252/182.14, 182.33, 252/182.35

See application file for complete search history.

(56) References Cited

U.S. PATENT DOCUMENTS

| 3,183,217 A | | 5/1965 | Serniuk et al. |
| 3,959,225 A | | 5/1976 | Kuntz |
| 4,943,616 A | * | 7/1990 | Mishra et al. ............... 525/264 |
| 4,978,777 A | | 12/1990 | Takagawa et al. |
| 5,854,367 A | * | 12/1998 | Salvetat et al. .......... 526/347.1 |
| 6,545,064 B1 | | 4/2003 | Bilodeau et al. |

FOREIGN PATENT DOCUMENTS

EP 0 710 675 5/1996

OTHER PUBLICATIONS

Database WPI Section Ch, week 199402 Derwent Publication ltd., London; Class A17 AN 1994-012330 XP002325366 & JP 05 320256 A Dec. 3, 1993.
Supplementary European Search Report for European Application No. 03 72 8789 completed on Apr. 20, 2005.

* cited by examiner

*Primary Examiner*—Fred Teskin
(74) *Attorney, Agent, or Firm*—Myers Bigel Sibley & Sajovec, PA

(57) ABSTRACT

The polymerization of polar vinyl monomers in the presence of Lewis acids produces stereoregular vinyl polymers. Polar vinyl monomers may be mixed with Lewis acids to form associations or complexes between the monomers and Lewis acids. The mixtures or monomer-Lewis acid complexes may be polymerized to produce the desire stereoregular vinyl polymers.

17 Claims, 1 Drawing Sheet

STEREOREGULAR POLAR VINYL POLYMERS AND METHODS OF MAKING THE SAME

CROSS-REFERENCE TO RELATED APPLICATIONS

Figure 1:
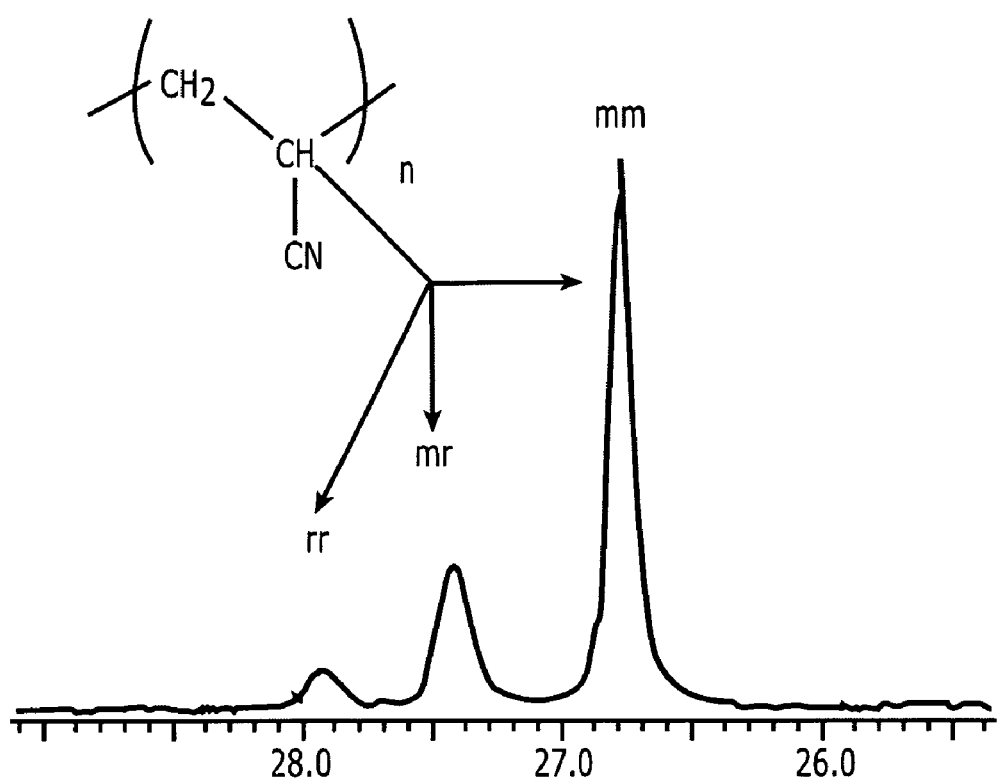

This application claims the benefit of, and incorporates herein by reference, U.S. Provisional Application No. 60/379,470, filed May 10, 2002 and entitled PRODUCTION OF STEREOREGULAR POLAR VINYL POLYMERS.

FIELD OF THE INVENTION

This invention generally relates to polar vinyl polymers and their production. More particularly, the invention relates to processes and methods for producing highly stereoregular polar vinyl polymers.

BACKGROUND OF THE INVENTION

Polar vinyl polymers are vinyl polymers having polar pendant groups. They play an important role in industry and commercial processes. For example, polar vinyl polymers such as polyacrylonitrile, poly (vinyl alcohol), poly (methyl methacrylate) and polyacrylamide are well known and frequently used in industrial processes. Theoretically, the control of the microstructure of polar vinyl polymers can provide control of the qualities and properties of the polymers. Some of the properties of polar vinyl polymers that need to be controlled include stereoregularity, molecular weight, chain-end and monomer distribution.

Polar vinyl polymers are generally prepared by polymerizing monomers using a radical polymerization process. Radical polymerization processes are highly versatile and are commonly used in industry to prepare polymers. However, there is little regularity of the chemical structure of polymers obtained according to conventional processes, especially when polymerizing polar vinyl monomers. When these polymers are molded and shaped into fiber, film, or molding, the mechanical, chemical and thermal characteristics are not always satisfactory because the polymer crystallinity is low. For example, in the case of polyacrylonitrile, a fiber or film having low crystallinity shows poor heat resistance, especially in the wet state. Hence, the development of high-grade fabric articles with such polymers is limited and their use in many industrial or space applications is similarly limited.

In the case of non-polar polyolefins, stereoregular polymerization has been accomplished using heterogeneous or homogenous organometalic catalysts such as Zieglar-Natta, metallocene, or late-transition metal complexes during polymerization. Most of these catalysts, however, are not effective for the polymerization of polar vinyl monomers because the polar group in the monomer deactivates the catalyst. A few catalysts such as rare earth metal complexes (J. Am. Chem. Soc. 1992, 114, 4908, Macromolecules 1996, 29, 8014), have been successfully employed for the stereospecific polymerization of methacrylates, but even with these catalysts, other polar vinyl monomers such as acrylonitrile can not be polymerized, let alone in a stereoregular fashion. Furthermore, some of these catalysts are highly unstable in the presence of air and moisture, which has inhibited their development in industrial polymer production.

Anionic polymerization has also been reported as an effective method for stereoregular polymer production. Anionic polymerization, however, is also industrially impractical due to low efficiency (process and/or yield) and low molecular weight of the resistant polymer due to sensitivity of the intermediates and side reactions that occur between the initiator or propagation anionic species and the polar group. For example, the reaction of tert-butyllithium/trialkylaluminum initiator and alkylaluminum/phosphin complex reportedly produces syndiotactic methacrylates, but the resultant polymers formed by this reaction have low molecular weights of less than 10,000. Isotactic polyacrylonitrile with meso-meso (mm) triad up to 70% was obtained when acrylonitrile was polymerized using alkyl alkaline earth compounds such as Mg as the initiators at 70° C. Unfortunately, significant side reactions between the cyano group and the initiator restricts polymer yields to a range near 10–30%.

Several studies have focused on the stereo-controlled free radical polymerization of vinyl monomers. If the monomers are absorbed into several inclusion compounds such as urea-acrylonitrile and deoxycholic acid-methacrylates, and irradiated by X-ray radiation at low temperatures, polymers having the stereoregularity, i.e., isotactic-rich polyacrylonitrile or syndiotactic-rich poly(methyl methacrylate) are obtained (i.e., J. Am. Chem. Soc., 1960, 2, 5671). Recently, isotactic or syndiotactic poly (vinyl alcohol) has been prepared by radical polymerization of bulky vinyl esters in the presence of bulky fluoroalcohols that are thought to complex to the monomers via hydrogen bonding. Saponification is then necessary in order to deprotect to the alcohol (Macromolecules, 1999, 31, 7598). These systems, however, are still not appropriate for industrial applications due to the specificity of host-monomer combination and the conditions of the polymerization process (e.g., necessity of low temperatures below –30° C.) and/or photo irradiation due to the instability of the hydrogen bonded complexes above 0° C.

Several decades ago, Lewis acids such as zinc chloride had been found to significantly affect monomer reactivity and stereochemistry during radical copolymerization. However, the stereochemistry during radical homopolymerization with Lewis acid had not been reported until very recently because no stereoregularity had been observed. In 2001, it was reported that use of catalytic amount (0.1–0.2 equivalents per monomer) of specific rare metal containing Lewis acids such as scandium trifluoromethanesulfonate $(Sc(OTf)_3)$ was shown to effect on the stereospecific radical polymerization of some polar vinyl monomer such as acrylamide and N,N-disubstituted acrylamide (i.e., J. Am. Chem. Soc. 2001, 123, 7180). However, even with these specific rare metal Lewis acids, clear effect on the stereospecific polymerization of other conventional vinyl monomers such as methacrylates, acrylonitrile and vinyl acetate have not been shown. Moreover, these rare-earth metal Lewis acids are expensive and any improvement of the polymerization process must include the recycling of rare-earth metals, which is expensive and undesirable.

Therefore, processes and methods for producing stereoregular vinyl polymers from polar vinyl monomers are desirable.

SUMMARY OF THE INVENTION

The present invention relates to the formation of stereoregular vinyl polymers from polar vinyl monomers mixed with, complexed with, or associated with Lewis acids. In various embodiments of the present invention, vinyl monomers are mixed with Lewis acids at a temperature of about 60° C. or below to form a non-covalent molecular interaction between the monomer and the Lewis acid. The non-covalent molecular interaction between the monomers and Lewis acids create monomer-Lewis acid complexes. The monomer-Lewis acid complex is polymerized using radical initiation and/or a source of energy such as X-ray, ultraviolet light, and/or heat. Polymerization may include heterogeneous and/or homogeneous polymerization. Other conventional monomer polymerization methods may also be used. Polymers polymerized from the monomer-Lewis acid complex may be separated from remaining Lewis acid by washing the Lewis acid from the polymers. The stereoregular polymers formed accordingly exhibit superior chemical and physical properties as compared to vinyl polymers prepared outside the presence of a Lewis acid.

In other embodiments of the present invention the monomer-Lewis acid complexes may be formed by polar vinyl monomers represented by the formula $CH_2$=CRX, wherein R may be hydrogen, 1–12 carbon alkyl groups, 1–12 carbon aryl groups, and 1–12 carbon alkoxy groups and X may be —CN, —$C_6H_5$N, —CONR'R", —OR', —COOR', —OCOR', —COR', —$C_6H_5$OH, —$C_6H_5$OR', and/or —$C_6H_5$NR'R", R' and R" are 1–12 carbon alkyl groups. The Lewis acids may be selected from Lewis acids containing elements selected from groups Ia, Ib, IIa, IIb, IIIa, IIIb, and VIII of the periodic table.

The various embodiments of the present invention permit the stereoregulation of monomer propagation through the stable and regular molecular aggregation of monomer-Lewis acid complexes. The monomer-Lewis acid complexes make specific geometric structures by non-covalent molecular interactions between the monomer and Lewis acid. These interactions are generally stable at room temperature. The interactions allow the degree of stereoregularity and composition of the resulting polymers to be controlled by altering the ratio and selection of the monomer and the corresponding Lewis acid.

BRIEF DESCRIPTION OF THE DRAWING FIGURES

Figure 2:
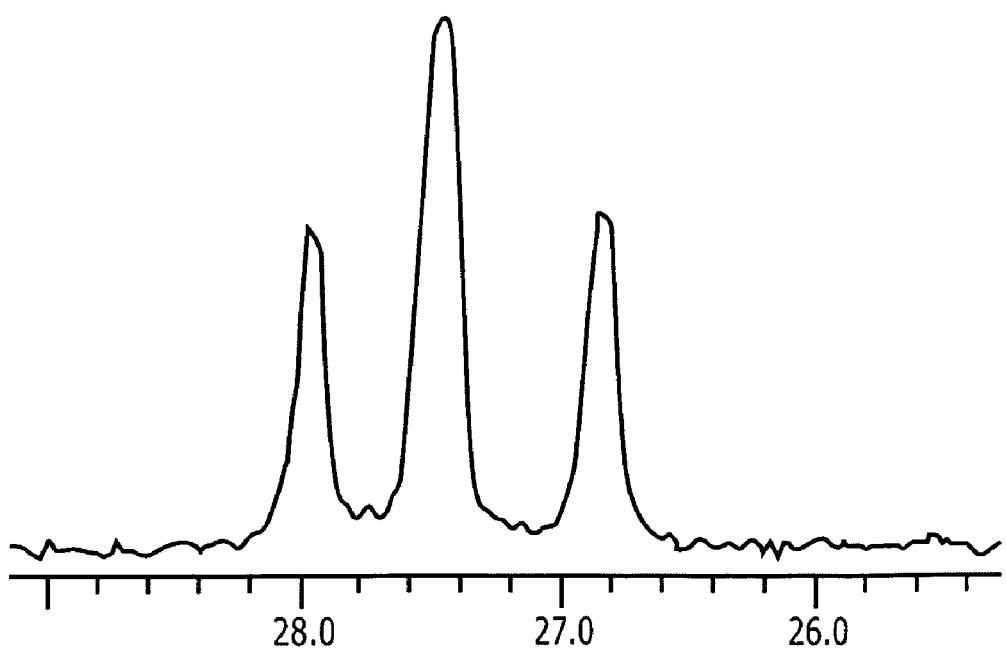

The invention can be more readily ascertained from the following description of the invention when read in conjunction with the accompanying drawings in which:

FIG. 1 illustrates a $^{13}$C-NMR chart showing the resonance peaks of a polyacrylonitrile having a triad tacticity with mm/mr/rr fractions of 0.670/0.253/0.077, respectfully, which correspond to the polymer of Example 1; and FIG. 2 illustrates a $^{13}$C-NMR chart showing the resonance peaks of an atactic polyacrylonitrile having a triad tacticity with mm/mr/rr fractions of 0.268/0.474/0.258, respectively, which correspond to the polymer of Comparative Example 1.

DETAILED DESCRIPTION OF THE INVENTION

The present invention now will be described more fully hereinafter with reference to the accompanying drawings. This invention may be embodied in many different forms and should not be construed as limited to the embodiments set forth herein; rather, these embodiments are provided so that this disclosure will be thorough and complete, and will fully convey the scope of the invention to those skilled in the art.

The present invention generally relates to stereoregular polar vinyl polymers and the stereoregular radical polymerization of polar vinyl monomers. According to various embodiments of the processes and methods of the present invention, stereoregular polar vinyl polymers may be formed by the radical polymerization of polar vinyl monomers in the presence of a Lewis acid. Using polar vinyl monomers and Lewis acids as starting materials, stereoregular vinyl polymers possessing isotacticity and/or syndiotacticity of about 35 percent or more may be accomplished using industrially viable radical polymerization processes.

In various embodiments of the present invention, polar vinyl monomers are mixed with Lewis acids to form non-covalent molecular interactions between the monomer and Lewis acid. The non-covalent molecular interactions between the monomer and Lewis acid forms a monomer-Lewis acid complex. The complex formation between the monomer and Lewis acid may be determined by spectroscopy, such as Infrared or IR spectroscopy. The stretching mode of the polar group in the monomers may cause a clear wave number shift by the complex formation with a Lewis acid metal because the force constant of the atom-atom bonding in the polar groups are changed by a Lewis acid-base interaction with the monomer. Moreover, in the case of liquid monomers, the monomer is generally absorbed into a Lewis acidic salt, forming a complex that results in a dry, powder like crystal. Adding radical polymerization initiators to the monomer-Lewis acid complexes polymerizes the monomers, forming stereoregular polar vinyl polymers. Following polymerization, the resultant polymers may be separated from the Lewis acids by washing the polymer-Lewis acid complexes to remove the Lewis acids from the polymers.

In certain embodiments of the present invention, polar vinyl monomers, represented by the formula $CH_2$=CRX, are polymerized in the presence of a Lewis acid to form stereoregular polar vinyl polymers. The polar vinyl monomers represented by the formula $CH_2$=CRX include monomers wherein X is a polar group and R is hydrogen, a 1–12 carbon alkyl group, a 1–12 carbon aryl group, or a 1–12 carbon alkoxy group. Examples of 1–12 carbon alkyl groups include methyl, ethyl, propyl, isopropyl, butyl, isobutyl, tert-butyl, pentyl, hexyl, heptyl, octyl, nonyl, decyl, and dodecyl groups. Examples of 1–12 carbon aryl groups include phenyl, toluyl, and naphtyl groups. Examples of 1–12 carbon alkoxy groups include methoxy, ethoxy, propyloxy, butyloxy, phenoxy, and naphtoxy groups, whose parts may be substituted. The polar group X may include polar groups such as —CN, —$C_6H_5$N, —CONR'R", —OR', —COOR', —OCOR', —COR', —$C_6H_5$OH, —$C_6H_5$OR', and/or —$C_6H_5$NR'R"; wherein each R' and R" are a 1–12 carbon alkyl group, such as methyl, ethyl, propyl, isopropyl, butyl, isobutyl, tert-butyl, pentyl, hexyl, heptyl, octyl, nonyl, decyl, and dodecyl groups.

A monomer-Lewis acid complex is formed by mixing the $CH_2$=CRX polar vinyl monomers with a Lewis acid at a temperature of about 60° C. or below. Although the monomers and Lewis acids may be mixed at higher temperatures, unfavorable side reactions such as the dissociation of the complex and/or uncontrolled monomer polymerizations may occur with monomer-Lewis acid complexes formed at temperatures higher than 60° C. In an attempt to avoid unfavorable side reactions, the monomer-Lewis acid complexes of the present invention are generally formed at 60° C. or below, more preferably at 50° C. or below, and most preferably at 40° C. or below.

According to embodiments of the invention, the monomers may be mixed with a Lewis acid to form the monomer-Lewis acid complexes in the absence of a solvent or in the presence of a solvent. In those embodiments where the monomers are mixed with Lewis acid in the presence of a solvent, low-polar, aprotic solvents are preferred. Solvents that are inert toward prohibiting complex formation between the monomers and Lewis acid are also preferred. For example, some solvents that are suitable for various embodiments of the present invention include pentane, hexane, heptane, octane, benzene, toluene, xylene, dichloromethane, diethyether, and tetrahydrofuran. In some embodiments, it is preferred that a sufficient amount of solvent is used to form a slurry with the monomer-Lewis acid complex.

The sterospecificity and/or polymerization rate of the monomer-Lewis acid complexes may also be controlled or altered with the addition of small amounts of emulsifiers or other compositions. For instance, the addition of glycols, nitriles, alcohols, amines and/or their related derivatives to the monomer-Lewis acid complexes may regulate stereoregularity or yields of the polymers formed during polymerization. It has been found that the addition of such compounds modifies the polymerization system. It is believed that the presence of the additional compound with the monomer-Lewis acid complex forms a tri-complex that further modifies the orientation of the monomer. The alteration of the monomer orientation alters the polymerization of the monomer. For example, the addition of bulky nitriles such as trimethylacetonitrile to acrylonitrile/magnesium chloride complexes can enhance the isotacticity of the resultant polyacrylonitriles formed during polymerization. In some embodiments, the additional compounds may be added to the monomer-Lewis acid complexes in an amount of between about 0.1 molar equivalents of the monomer to about 5 molar equivalents of the monomer.

Lewis acids may include a single Lewis acid or a mixture of one or more Lewis acids. Lewis acids that may be used with the various embodiments of the present invention include Lewis acids containing elements from groups Ia, Ib, IIa, IIb, IIIa, IIIb, and VIII of the periodic table. For example, Lewis acids that may be used with the various embodiments of the present invention include Lewis acids containing metals such as lithium, sodium, potassium, copper, beryllium, magnesium, calcium, strontium, barium, boron, aluminum, garium, indium, iron, nickel, and cobalt. Lewis acids according to the embodiments of the invention may also include chloride, bromide, iodide, sulfonate, nitrate, trifluoromethanesulfonate, and organometallics such as alkyl, aryl, and alkoxy compounds of various metals. For instance, magnesium chloride, magnesium bromide, magnesium trifluoromethanesulfonate, aluminum chloride, and lithium bromide may be used as Lewis acids with the embodiments of the present invention. Lewis acids used with the embodiments of the present invention may also be weak or moderate acids.

The mixing of a Lewis acid with $CH_2=CRX$ monomers forms a monomer-Lewis acid complex. Lewis base atoms in the monomers, such as nitrogen and/or oxygen, coordinate with the Lewis acid to form the complex. A sufficient amount of Lewis acid is mixed with the monomers to promote the formation of the monomer-Lewis acid complexes. However, the mixing of excess amounts of Lewis acid with the monomers is preferably avoided in order to curtail unfavorable side reactions that may be caused by the presence of excess amounts of Lewis acid. To avoid the presence of excess amounts of Lewis acid, the Lewis acid is added to or mixed with the monomer in an amount of about 0.1 moles to about 10 moles of Lewis acid per mole of monomer. Thus, the ratio of moles of Lewis acid to moles of monomer is between, and includes, 0.1 and 10. The addition of less than 0.1 moles of Lewis acid per mole of monomer has been found to be insufficient to promote the stereoregularity of the resultant polymers and the addition of more than 10 moles of Lewis acid results in excess amount of Lewis acid in the monomer-Lewis acid complex. In certain embodiments of the present invention it is preferred to mix the Lewis acid with the monomers in a ratio of about 0.2 to about 4.0 moles of Lewis acid per mole of monomer.

The monomer-Lewis acid complexes formed according to embodiments of the present invention may be polymerized using radical initiators. The polymerization of the monomer-Lewis acid complex results in a polymer-Lewis acid mixture. Conventional radical initiators such as azo compounds, organic and/or inorganic peroxides, and redox systems may be used for the radical polymerization. Azo compounds may include compounds such as AIBN, 2,2'-azobis(4-isovaleronitrile), and 2,2'-azobis(4-methoxyvaleronitrile). Organic and/or inorganic peroxides include benzoyl peroxides and potassium peroxosulfate, while redox systems include hydrogen peroxide/iron systems and organoboron/oxygen systems. Other convention polymerization methods may also be used with the embodiments of the present invention. The monomer-Lewis acid complexes may also be polymerized using physical initiation techniques, such as by X-ray irradiation, electron beam exposure, ultra-violet light exposure, and heat exposure. Combinations of initiators may also be used to polymerize the monomer-Lewis acid complexes. Where initiator combinations are used, they should be selected so that they do not react with each other or deactivate other initiators being used.

The polymerization of the monomer-Lewis acid complexes is preferably carried out at temperatures that will not cause the monomer-Lewis acid complexes to dissociate or decompose. For instance, the polymerization may occur at temperatures of about 60° C. or below, preferably 50° C. or below, and most preferably at about 40° C. or below. In addition, the polymerization may occur with or without a solvent such as low polar and aprotic solvents. For instance, solvents such as those that may be used with the mixing of the monomers and Lewis acids to form the monomer-Lewis acid complexes may be used.

The polar vinyl polymers resulting from the polymerization of the monomer-Lewis acid complexes may be separated from the Lewis acid by washing the polymer-Lewis acid mixture with a solution to remove the Lewis acid from the polymers. For instance, the polymer-Lewis acid may be washed with water and/or a protic polar organic solvent such as methanol. Multiple washings with single or multiple wash substances may also be used.

The polar vinyl polymers created according to the various embodiments of the present invention provide stereoregular polar vinyl polymers containing isotacticity (triads) and/or syndiotacticity (triads) of more than 35 percent in the polar vinyl monomers. Although the mechanisms for the stereospecific polymerization in the embodiments of the present invention have not been clearly delineated, it is hypothesized that the Lewis acid coordinates with the Lewis base heteroatom in the monomer so that the direction of attack of the propagating species to the monomer-Lewis acid complex is restricted, resulting in the observed stereoregularity.

The microstructure of the resulting stereoregular polar vinyl polymers of the present invention may contain isotactic triads with neighboring triad monomers linked together by meso-meso (mm) sequences and/or syndiotactic triads linked with racemo-racemo (rr) sequences. Heterotactic triad consists of meso-racemo (mr) triad sequences. The fraction of isotactive triads and/or syndotactic triads in the polymers of the present invention is greater than or equal to 35 percent The content or fractions of (rr), (mm), and/or (mr) linkage fractions in the resulting polymers may be determined using $^{13}$C-NMR and/or $^1$H-NMR analysis. Such analysis provides graphs as illustrated in FIGS. 1 and 2, wherein the peaks each represent the fraction of (rr), (mm), and/or (mr) linkages in the polymer. The peaks of FIG. 1 correspond to Example 1 and a polyacrylonitrile formed using embodiments of the present invention. The peaks of FIG. 2 illustrate an atactic polyacrylonitrile corresponding to Comparative Example 1.

The stereoregular polar vinyl polymers of the present invention may be processed into fibers, film or other molded articles. They can be used as a modifier with other conventional materials through blending, hybridization, and/or copolymerization. They also exhibit better physical and chemical properties then other polar vinyl monomers formed according to conventional methods. The superior physical and chemical properties of the stereoregular vinyl monomers formed according to embodiments of the present invention provide additional benefits over tradition polar vinyl monomers and are beneficial in the formation of high performance and functional materials. Polymers formed according to embodiments of the present invention also exhibit superior mechanical properties, heat resistance, solvent resistance, and chemical resistance. For instance, syndiotactic poly (methyl methacrylate), poly(vinyl alcohol) and isotactic polyacrylonitrile formed according to embodiments of the present invention have superior mechanical and thermal properties as compared with the atactic polymers. Furthermore, the processes and methods of the present invention are low-cost polymerization processes, making stereoregular polar vinyl polymers formed according to embodiments of the present invention desirable.

In other embodiments of the present invention, Lewis acids may be added during the polymerization of polar vinyl monomers to form the monomer-Lewis acid complexes that result in desired stereoregular polymerization products, such as stereoregular polar vinyl polymers. Upon addition of Lewis acid to a polymerization reaction involving polar vinyl monomers, the Lewis acid forms complexes with the polar vinyl monomers. The continued polymerization of the mixture includes the polymerization of the monomer-Lewis acid complexes formed by the addition of the Lewis acid. The polymerization of the monomer-Lewis acid complexes forms the stereoregular polar vinyl polymers of the present invention.

In other embodiments of the present invention, comonomers may be copolymerized with the polar vinyl monomers during the radical polymerization process. The comonomers may be added to the monomer-Lewis acid complexes formed before or during polymerization or they may be added during the polymerization reaction. Comonomers capable of copolymerization according to embodiments of the present invention include polar vinyl monomers and non-polar vinyl monomers. For instance, polar vinyl monomers include acrylic acid, methacrylic acid, crotonic acid, vinylacetic acid, allylamine, vinyl chloride, vinylidene chloride, vinylsulfonic acid, salts of vinylsulfonic acid. Non-polar vinyl monomers that may be copolymerized include ethylene, polyolefins, di-substituted vinyl compounds such as itaconic acid, maleic acid, maleic anhydride, and divinyl compounds such as divinyl benzene and vinyl methacrylate.

In other embodiments of the present invention the isotactic polar vinyl polymers produced according to embodiments of the present invention are useful as hydrophilic selective adsorption materials for metals.

Some examples of polar vinyl monomers that may be used with the various embodiments of the present invention include hydroxystyrene, acrylates, methacrylates, alkoxymethylacrylates, N,N-alkylacrylamide, methacrylamide, N,N-alkyl methacrylamide, and alkyl vinyl ketones. Monomers such as acrylonitrile, methacrylonitrile, aminostyrene, vinylpyridine, vinyl acetate, acetoxystyrene, methyl acrylate, methyl methacrylate, acrylamide, N,N-dimethylacrylamide, N,N-diisopropylacrylamide, methacrylamide, and N,N-dimethylmethacrylamide are preferred for the embodiments of the present invention.

In an embodiment of the present invention the polar vinyl monomer comprises an acetylonitrile group such that the monomer is represented by the formula $CH_2$=CRCN. A stereoregular polymer formed from the monomer according to embodiments of the present invention exhibits isotacticity and/or syndiotacticity of about 35 percent, which is higher than the results received using conventional methods. In another embodiment, a polar vinyl monomer represented by the formula CH2=CRCOOR' polymerized according to embodiments of the present invention results in a polymer having an isotacticity and/or syndiotacticity of about 65 percent or higher.

Various embodiments of the present invention are described in detail in the following Examples, which are set forth for the purpose of illustration only and are not to be construed as limitations on the present invention:

EXAMPLE 1

A three-necked reaction vessel fitted with a stirrer, a thermometer and a dried nitrogen purge was charged with 6 mL of dry heptane and 4.76 g of magnesium chloride. The vessel was cooled down to 0° C. and 1.65 mL of acrylonitrile was then added. Reaction occurred immediately, as evidenced by an exothermic reaction, and rose to about 10–15° C. over a period of 30 minutes. A white slurry was formed. FT-IR of this slurry shows that stretching peak of C≡N moiety of acrylonitrile shifts from 2224 $cm^{-1}$ in bulk state to 2265 $cm^{-1}$ in acrylonitrile-magnesium chloride mixture, indicating the formation of acrylonitrile/magnesium chloride complex. About 40 mg of 2,2'-azobiz(4-methoxyvaleronitrile) was added into this slurry and the resultant reaction mixture was allowed to proceed for 48 hours at 20° C. The resulting polymer was removed from Lewis acid (magnesium chloride) by washing with 100 mL of methanol and then 200 mL of deionized hot water. The polymer was then dried in vacuo at 50° C. for 24 hours to obtain 395 mg of a polyacrylonitrile. This polymer was dissolved at a concentration of 5% by weight in deuterated dimethylsulfoxide and $^{13}$C-NMR analysis was performed. It was found that the mm, mr and rr fractions were 0.670, 0.253, 0.077, respectively, indicating that this polymer is isotactic-rich polyacrylonitrile.

EXAMPLE 2

1.17 g of stereoregular polyacrylonitrile was prepared in the same manner as described in Example 1, except that 3.30 mL of acrylonitrile monomer and 80 mg of 2,2'-azobis (4-methoxyvaleronotrile) initiator were used. The resultant polymer was dissolved at a concentration of 5% by weight in deuterated dimethylsufoxide and $^{13}$C-NMR analysis was performed. It was found that the mm, mr and rr fraction were 0.591, 0.307 and 0.102, respectively, indicating that this polymer is isotactic-rich polyacrylonitrile.

EXAMPLE 3

430 mg of stereoregular polyacrylonitrile was prepared in the same manner as described in Example 1, except that 9.23 g of magnesium bromide was used as the Lewis acid, 3.30 ml of acrylonitrile monomer was used and 80 mg of 2,2'-azobis (40methoxyvaleronitrile) initiator was used. The resultant polymer was dissolved at a concentration of 5% by weight in deuterated dimethylsulfoxide and $^{13}$C-NMR analysis was performed it was found that the mm, mr and rr fractions were 0.615, 0.288 and 0.097 respectively, indicating that this polymer is isotactic-rich polyacrylonitrile.

EXAMPLE 4

220 mg of stereoregular polyacrylonitrile was prepared in the same manner as described in Example 1, except that 3.22 g of magnesium trifluoromethanesulfonate was used as the Lewis acid, 0.44 ml of acrylonitrile monomer was used, and 10 mg of 2,2'-azobis (40methoxyvaleronitrile) initiator was used. FT-IR of the slurry shows that stretching peak of C≡N moiety of acrylonitrile shifts from 2224 cm$^{-1}$ in bulk state to 2235 cm$^{-1}$ in acrylonitrile/magnesium trifluoromethanesulfonate mixture, indicating the formation of acrylonitrile/magnesium trifluoromethanesulfonate complex. The resultant polymer was dissolved at a concentration of 5% by weight in deuterated dimethylsulfoxide and $^{13}$C-NMR analysis was performed. It was found that the mm, mr and rr fractions were 0.387, 0.433 and 0.180 respectively, indicating that the polymer was an isotactic-rich polyacrylonitrile.

EXAMPLE 5

A three-necked vessel fitted with a stirrer, a thermometer and a dried nitrogen purge was charged with 2.67 g of aluminum chloride. The vessel was cooled to 10° C. and 2.14 ml of methyl methacrylate was added. A reaction occurred gradually over a period of 2 hours and a colorless crystalline complex resulted. FT-IR of this complex shows that stretching peak of C=O moiety of methyl methacrylate shifts from 1730 cm$^{-1}$ in bulk state to 1646 cm$^{-1}$ in methyl methacrylate/aluminum chloride mixture, indicating the formation of methyl methacrylate-aluminum chloride complex. 2,2-azobis (4-methoxyvaleronitrile) (60 mg) dissolved into 1 mL of benzene was then added to this complex and the polymerization was conducted for 48 hours at 20° C. The resultant polymer was separated from the Lewis acid by washing with 200 mL of methanol twice, washing in 200 ml of deionized hot water twice, and then drying in vacuo at 40° C. for 24 hours to obtain 1.2 g of a poly (methyl methacrylate). The resultant polymer was dissolved at a concentration of 1% by weight in deuterated chloroform and a $^1$H-NMR analysis was performed. It was found that the mm, mr and rr fractions were 0.040, 0.240 and 0.720 respectively, indicating that this polymer is syndiotactic-rich poly (methyl methacrylate).

EXAMPLE 6

A three-necked vessel fitted with a stirrer, a thermometer and a dried nitrogen purge was charged with 6 mL of dry heptane and 2.17 g of lithium bromide. The vessel was cooled to 10° C. and 2.7 ml of 4-vinylpyridine was then added. A reaction occurred smoothly. The temperature range varied from about 3–5° C. over a period of 30 minutes and a pale-yellow slurry mixture was produced. FT-IR of this slurry shows that stretching peak of C=C moiety of 4-vinylpyridine shifts from 1596 cm$^{-1}$ in bulk state to 1608 cm$^{-1}$ in 4-vinylpyridine/lithium bromide mixture, indicating the formation of in 4-vinylpyridine-lithium bromide complex. 2,2-azobis (4-methoxyvaleronitrile) (80 mg) was then added into this slurry and the polymerization was conducted for 96 hours at 20° C. The resultant polymer was separated from Lewis acid by washing with 500 mL of deionized hot water twice (2×), washing with 200 mL of ethyl ether and then drying in vacuo at 30° C. for 24 hours to obtain 2.0 g of a poly (4-vinylpyridine). This polymer was dissolved at a concentration of 5% by weight in deuterated chloroform and the $^{13}$C-NMR analysis was performed. It was found that the mm, mr and rr fractions were 0.124, 0.393 and 0.483 respectively, indicated that this polymer is syndiotactic-rich poly (4-vinylpyridine).

EXAMPLE 7

A three-necked vessel fitted with a stirrer, a thermometer and a dried nitrogen purge was charged with 3.22 g of magnesium trifluoromethanesulfonate. The vessel was cooled to 10° C. and 1.20 g of 4-aminostyrene dissolved into 6 mL of dry benzene was then added. Reaction occurred smoothly, the temperature range varying from about 3–5° C. over a period of 30 minutes and a pale-yellow slurry resulted. FT-IR of this slurry shows that stretching peak of N—H moiety of 4-aminostyrene shifts from 3396 cm$^{-1}$ in bulk state to 3491 cm$^{-1}$ in 4-aminostyrene/trifluoromethanesulfonate mixture, indicating the formation in 4-aminostyrene-trifluoromethanesulfonate complex. 2,2-azobis (4-methoxyvaleronitrile) (36 mg) was then added into this slurry, and the polymerization was conducted for 96 hours at 20° C. The resultant polymer was separated from Lewis acid by washing with 500 mL of deionized hot water twice, washing in 200 moles of hexane and then drying in vacuo at 30° C. for 24 hours to obtain 1.1 g of a poly (4-aminostyrene). This polymer was dissolved at a concentration of 5% by weight in deuterated methanol and $^{13}$C-NMR analysis was performed. It was found that the mm, mr and rr fractions were 0.703, 0.111 and 0.186 respectively, indicated that this polymer is isotactic-rich poly (4-aminostyrene).

EXAMPLE 8

A three-necked vessel fitted with a stirrer, a thermometer and a dried nitrogen purge was charged with 2.61 g of lithium bromide fine powder. The vessel was cooled to 10° C. and 2.58 ml of vinyl acetate was then added. Reaction occurred gradually over a period of 72 hours and a white slurry mixture resulted after the addition of 5 ml of dry heptane. FT-IR of this slurry shows that stretching peak of C=O moiety of vinyl acetate shifts from 1767 cm$^{-1}$ in bulk state to 1709 cm$^{-1}$ in vinyl acetate/lithium bromide mixture, indicating the formation of a vinyl acetate-lithium bromide complex. 2,2-azobis (4-methoxyvaleronitrile) (95 mg) was then added into this slurry, and the polymerization was conducted for 96 hours at 20° C. The resultant polymer was separated from Lewis acid by washing with 500 mL of deionized hot water twice, washing with 200 mL of hexane, and then drying in vacuo at 40° C. for 24 hours to obtain 0.8 g of a poly (vinylacetate). This polymer was dissolved at a concentration of 5% by weight in deuterated chloroform and the $^{13}$C-NMR analysis was carried out. It was found that the mm, mr and rr fractions were 0.356, 0.421 and 0.223 respectively, indicated that this polymer is syndiotactic-rich poly (4-vinylacetate).

EXAMPLE 9

A three-necked reaction vessel fitted with a stirrer, a thermometer and a dried nitrogen purge was charged with 6 mL of dry heptane and 4.76 g of magnesium chloride. The vessel was cooled down to 0° C. and 1.65 mL of acrylonitrile was then added. Reaction occurred immediately, as evidenced by an exothermic reaction, and rose to about 10–15° C. over a period of 30 minutes. White slurry was formed. Then 2.15 g of trimethylacetonitrile was added into this acrylonitrile/magnesium chloride complex in the same manner. Reaction occurred gradually, as evidenced by FT-IR, which shows that stretching peak of C≡N moiety of acrylonitrile shifts from 2224 cm$^{-1}$ in bulk state to 2265 cm$^{-1}$ and those of trimethylacetonitrile shifts from 2236 cm$^{-1}$ in bulk state to 2281 cm$^{-1}$ in acrylonitrile/magnesium chloride/trimethylacetonitrile mixture, indicating the formation of an acrylonitrile/magnesium chloride/trimethylacetonitrile tri-complex without dissociation of acrylonitrile from the complex. 2,2'-azobiz(4-methoxyvaleronitrile) was added into this slurry and the resultant reaction mixture was allowed to proceed for 48 hours at 20° C. The resulting polymer was removed from Lewis acid (magnesium chloride) and trimethylacetonitrile by washing with 100 mL of methanol and then 200 mL of deionized hot water. The polymer was then dried in vacuo at 50° C. for 24 hours to obtain 395 mg of a polyacrylonitrile. This polymer was dissolved at a concentration of 5% by weight in deuterated dimethylsulfoxide and $^{13}$C-NMR analysis was performed. It was found that the mm, mr and rr fractions were 0.700, 0.241, 0.059, respectively, indicating that this polymer is isotactic-rich polyacrylonitrile.

COMPARATIVE EXAMPLE 1

A three-necked vessel fitted with a stirrer, a thermometer and a dried nitrogen purge was charged with 6 mL of dry heptane, and 3.3 ml acrylonitrile. 2,2-azobis (4-methoxyvaleronitrile) (120 mg) was then added into this solution, and polymerization was conducted for 48 hours at 20° C. The resultant polymer was filtrated and washed with 100 mL of methanol, washed with 200 mL of deionized hot water, and was then dried in vacuo at 50° C. for 24 hours to obtain 1.78 g of a polyacrylonitrile. This polymer was dissolved at a concentration of 5% by weight in deuterated dimethylsulfoxide and the $^{13}$C-NMR analysis was performed. It was found that the mm, mr and rr fractions were 0.268, 0.474 and 0.258 respectively, indicating that this polymer is atactic polyacrylonitrile.

COMPARATIVE EXAMPLE 2

A three-necked vessel fitted with a stirrer, a thermometer, and a dried nitrogen purge was charged with 6 mL of dry heptane, and 2.14 g of methyl methacrylate. 2,2-azobis (4-methoxyvaleronitrile) (60 mg) was then added into this solution, and polymerization was conducted for 48 hours at 20° C. The resultant polymer was poured into 200 mL of methanol and filtrated and washed with another 100 mL of methanol, 200 mL of deionized hot water and was then dried in vacuo at 50° C. for 24 hours to obtain 1.90 g of poly (methyl methacrylate). This polymer was dissolved at a concentration of 1% by weight in deuterated chloroform and the $^1$H-NMR analysis was performed. It was found that the mm, mr and rr fractions were 0.053, 0.299 and 0.648 respectively, indicating that this polymer is atactic poly (methyl methacrylate).

COMPARATIVE EXAMPLE 3

A three-necked vessel fitted with a stirrer, a thermometer, and a dried nitrogen purge was charged with 6 mL of dry benzene, 4-vinylpryridine (2.16 ml) and 2,2-azobis (4-methoxyvaleronitrile) (63 mg). Polymerization was conducted for 48 hours at 20° C. The resultant polymer slurry was poured into 200 mL of n-hexane and filtrated and washed with another 500 mL of water, 300 mL of ethyl ether, and was then dried in vacuo at 50° C. for 24 hours to obtain 1.30 g of poly (4-vinylpyridine). This polymer was dissolved at a concentration of 5% by weight in deuterated methanol and the $^{13}$C-NMR measurement was performed. It was found that the mm, mr and rr fractions were 0.340, 0.355 and 0.305 respectively, indicating that this polymer is atactic poly (4-vinylpyridine).

COMPARATIVE EXAMPLE 4

A three-necked vessel fitted with a stirrer, a thermometer, and a dried nitrogen purge was charged with 6 mL of dry benzene and 2.38 g of aminostyrene. 2,2-azobis (4-methoxyvaleronitrile) (72 mg) was then added to this solution, and polymerization was conducted for 48 hours at 20° C. The resultant polymer slurry was poured into 200 mL of n-hexane, filtrated and washed with another 200 mL of n-hexane, and then 300 mL of deionized hot water. The polymer was then dried in vacuo at 50° C. for 24 hours to obtain 1.38 g of poly (4-aminostyrene). This polymer was dissolved at a concentration of 5% by weight in deuterated chloroform and the $^{13}$C-NMR analysis was performed. It was found that the mm, mr and rr fractions were 0.233, 0.422 and 0.345 respectively, indicating that this polymer is atactic poly (4-aminostyrene).

COMPARATIVE EXAMPLE 5

A three-necked vessel fitted with a stirrer, a thermometer, and a dried nitrogen purge was charged with 6 mL of dry benzene and 1.84 ml of vinylacetate. 2,2-azobis (4-methoxyvaleronitrile) (52 mg) was then added to this solution and polymerization was conducted for 48 hours at 20° C. The resultant polymer solution was poured into 200 mL of deionized water, filtrated and washed with another 500 ml of water and then 300 ml of n-hexane. The polymer was then dried in vacuo at 50° C. for 24 hours to obtain 1.1 g of a poly (4-vinylacetate). This polymer was dissolved at a concentration of 5% by weight in deuterated chloroform and the $^{13}$C-NMR analysis was performed. It was found that the mm, mr and rr fractions were 0.250, 0.452 and 0.298 respectively, indicating that this polymer is atactic poly (4-vinylacetate).

Having thus described certain preferred embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:
1. A composition comprising
   a monomer component, said monomer component consisting of polar vinyl monomers;
   a Lewis acid component mixed with said monomer component to form a monomer-Lewis acid complex; and
   a radical initiator.

2. A composition comprising the monomer-Lewis acid complex of claim 1, wherein said polar vinyl monomers are represented by the formula $CH_2$=CRX, wherein:
R is selected from the group consisting of hydrogen, 1–12 carbon alkyl groups, 1–12 carbon aryl groups, and 1–12 carbon alkoxy groups; and
X is selected from the group consisting of —CN, —$C_6H_5N$, —CONR'R", —OR', —COOR', —OCOR', —COR', —$C_6H_5$OH, —$C_6H_5$OR', and —$C_6H_5$NR'R";
wherein R' is a 1–12 carbon alkyl group; and
wherein R" is a 1–12 carbon alkyl group.

3. A composition comprising the monomer-Lewis acid complex of claim 2, wherein R is selected from the group consisting of hydrogen, methyl, ethyl, propyl, isopropyl, butyl, isobutyl, tert-butyl, pentyl, hexyl, heptyl, octyl, nonyl, decyl, dodecyl, phenyl, toluyl, naphtyl, methoxy, ethoxy, propyloxy, butyloxy, phenoxy, and naphthoxy groups.

4. A composition comprising the monomer-Lewis acid complex of claim 2, wherein R' and R" are selected from the group consisting of methyl, ethyl, propyl, isopropyl, butyl, isobutyl, tert-butyl, pentyl, hexyl, heptyl, octyl, nonyl, decyl, and dodecyl groups.

5. A composition comprising the monomer-Lewis acid complex of claim 1, wherein said Lewis acid component comprises at least one Lewis acid containing an elements selected from the group consisting of elements from groups Ia, Ib, IIa, IIb, IIIa, IIIb, and VIII of the periodic table.

6. A composition comprising the monomer-Lewis acid complex of claim 1, wherein said Lewis acid component comprises at least one Lewis acid containing a metal selected from the group consisting of lithium, sodium, potassium, copper, beryllium, magnesium, calcium, strontium, barium, boron, aluminum, gallium, indium, iron, nickel, and cobalt.

7. A composition comprising the monomer-Lewis acid complex of claim 1, wherein said Lewis acid component comprises at least one Lewis acid containing a substituent selected from the group consisting of chloride, bromide, iodide, sulfonate, nitrate, and trifluoromethanesulfonate.

8. A composition comprising the monomer-Lewis acid complex of claim 1, wherein said Lewis acid component comprises at least one Lewis acid comprising an organometallic selected from the group consisting of alkyl organometallics, aryl organometallics, and alkoxy organometallics.

9. A composition comprising the monomer-Lewis acid complex of claim 1, wherein said Lewis acid component comprises at least one Lewis acid selected from the group consisting of magnesium chloride, magnesium bromide, magnesium trifluoromethanesulfonate, aluminum chloride, and lithium bromide.

10. A composition comprising the monomer-Lewis acid complex of claim 1, wherein said Lewis acid component is present in an amount of about 0.1 to about 10 equivalents of the polar vinyl monomers.

11. A composition comprising the monomer-Lewis acid complex of claim 1, wherein said Lewis acid component is present in an amount of about 0.2 to about 4 equivalents of the polar vinyl monomers.

12. A composition comprising the monomer-Lewis acid complex of claim 1, wherein said monomer component and said Lewis acid component are mixed at a temperature of about 60° C. or below.

13. A composition comprising the monomer-Lewis acid complex of claim 1, wherein said monomer-Lewis acid complex is at a temperature of about 60° C. or below.

14. A composition comprising the monomer-Lewis acid complex of claim 1, wherein said polar vinyl monomers are selected from the group consisting of acrylonitrile, methacrylonitrile, aminostyrene, vinylpyridine, vinyl acetate, hydroxystyrene, acetoxystyrene, acrylates, methacrylates, alkoxymethylacrylates, acrylamide, N,N-alkylacrylamide, methacrylarnide, N,N-alkylmethaerylarnides, and alkyl vinyl ketones.

15. A composition comprising the monomer-Lewis acid complex of claim 1, further comprising at least one solvent.

16. A composition comprising the monomer-Lewis acid complex of claim 15, wherein said solvent is selected from the group consisting of pentane, hexane, heptane, octane, benzene, toluene, xylene, dichloromethane, diethylether, and tetrahydrofuran.

17. A composition comprising the monomer-Lewis acid complex of claim 1, further comprising at least one additive selected from the group consisting of glycols, nitriles, alcohols, and amines.

* * * * *

UNITED STATES PATENT AND TRADEMARK OFFICE
CERTIFICATE OF CORRECTION

PATENT NO. : 7,091,293 B2 Page 1 of 1
APPLICATION NO. : 10/512448
DATED : August 15, 2006
INVENTOR(S) : Kuwahara et al.

It is certified that error appears in the above-identified patent and that said Letters Patent is hereby corrected as shown below:

Column 14,
Line 29 should read -- methacrylamide, N, N-alkylmethaerylamides, and alkyl --

Signed and Sealed this

Twenty-seventh Day of March, 2007

JON W. DUDAS
*Director of the United States Patent and Trademark Office*